3,767,649
PROCESS FOR MAKING DERIVATIVES OF
LINCOMYCIN AND ITS ANALOGS
Brian Bannister, Kalamazoo, Mich., assignor to The
Upjohn Company, Kalamazoo, Mich.
No Drawing. Continuation-in-part of abandoned application Ser. No. 158,075, June 29, 1971. This application Nov. 15, 1971, Ser. No. 199,046
Int. Cl. C08b 19/00
U.S. Cl. 260—210 R                            13 Claims

ABSTRACT OF THE DISCLOSURE

Alkyl 7-deoxy-7-RS-α-thiolincosaminides useful as intermediates for preparing antibacterially active 7-deoxy-7-RS-lincomycins are prepared by heating alkyl N-acyl-6,7 - aziridino - 6 - deamino-7-deoxy-α-thiolincosaminides with a non-aromatic, cyclic monosulfide in the presence of glacial acetic acid or other anhydrous lower-alkanoic acid, or anhydrous benzoic acid or other anhydrous arenoic acids of not more than 12 carbon atoms.

CROSS REFERENCE TO RELATED APPLICATIONS

This application is a continuation-in-part of our copending application Ser. No. 158,075, filed June 29, 1971, now abandoned.

BRIEF DESCRIPTION OF THE INVENTION

This invention relates to alkyl 7-deoxy-7-RS-α-thiolincosaminides of Formula I and acylates thereof and to a process for making the same

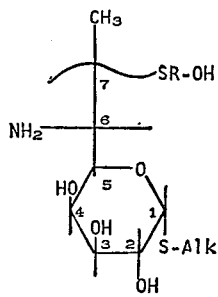

wherein Alk is alkyl of not more than 4 carbon atoms, to wit, methyl, ethyl, propyl, isopropyl, butyl, sec.butyl, isobutyl, and tert.butyl or 2-hydroxyethyl; and R is the radical of a non-aromatic, cyclic monosulfide, that is to say, the divalent radical atached to the sulfur of a non-aromatic, cyclic monosulfide, to intermediates and to final products derived therefrom.

The compounds of Formula I can be obtained by heating an Alk N-acyl-6,7-aziridino-6-deamino-7-deoxy-α-thiolincosaminide of the formula:

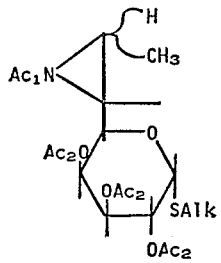

in which $Ac_1$ and $Ac_2$ are carboxacyl, with a non-aromatic, monosulfide of the formula

in the presence of glacial acetic acid or other anhydrous loweralkanoic acid or anhydrous benzoic acid or other arenoic acid of not more than 12 carbn atoms. Opening of the aziridine ring is thus effected yielding an acylated Alk 7-deoxy-7-(AcORS)-α-thio-lincosaminide of the following formula:

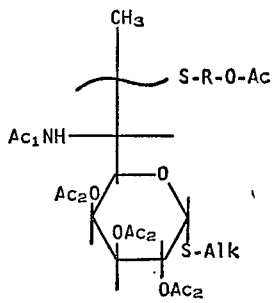

wherein R, $Ac_1$, and $Ac_2$ are as above, Alk is as above or $Ac_2O—CH_2CH_2—$, and Ac is the acyl of the acid used in the process.

The acyl groups are then removed by hydrazinolysis in a manner already well known in the art (see U.S. 3,179,565) to yield alkyl 7-deoxy-7-(HORS)-α-thiolincosaminide of Formula I.

The compounds of the invention (Formula I) are useful for the same purposes as methyl α-thiolincosaminide (methyl 6 - amino - 6,8 - dideoxy - 1 - thio-D-erythro-α-D-galacto-octopyranoside, α-MTL) as disclosed in U.S. Pat. 3,380,992 and as methyl 6 - amino - 7 - chloro-6,7,8 - trideoxy - 1 - thio-L-threo- and D-erythro-α-D-galacto-octopyranosides (U.S. Pats. 3,496,163 and 3,502,648), and moreover can be acylated with trans-1-methyl-4-propyl-L-2-pyrrolidine carboxylic acid to form 7 - deoxy - 7 - (HORS)-lincomycin and with other L-2-pyrrolidine carboxylic acids as disclosed in these patents, or with an N-(2-hydroxyethyl)-L-2-pyrrolidine carboxylic acid to form compounds of the formula:

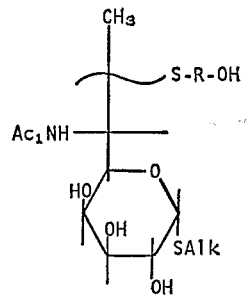

wherein R and Alk are as given and $Ac_1$ is L-2-pyrrolidinecarboxacyl or an N-methyl, N-ethyl, or N-(2-hydroxyethyl)-L-2-pyrrolidinecarboxacyl any or all of which can be substituted in the 4-position with loweralkyl or loweralkylidene.

PRIOR ART

It is known that 7-SH analogs can be prepared by heating an aziridino compound of Formula II where Ac is hydrogen with hydrogen sulfide. It has not been possible, heretofore, to replace the S-hydrogen, either directly or indirectly. Moreover, the compounds of the invention are substantially more active than the corresponding 7-SH compounds. For example 7-deoxy-7(S)-(methylthio)lincomycin hydrochloride is several times more active in vitro than lincomycin whereas 7-deoxy-7(S)-mercaptolincomycin hydrochloride is less active than lincomycin.

It is also known that 7-OR analogs can be prepared by reacting a compound of Formula II with an alcohol in the presence of an acid. Efforts to produce the sulfur analogs by substituting the alcohol by a mercaptan have been unsuccessful.

DETAILED DESCRIPTION

It has now been found that compounds of Formula II undergo sulfidolysis when heated with a non-aromatic cyclic monosulfide in glacial acetic acid or other anhydrous loweralkanoic acid, or anhydrous benzoic acid or other anhydrous arenoic acids of not more than 12 carbon atoms. The following equations illustrate probable mechanism for the reaction.

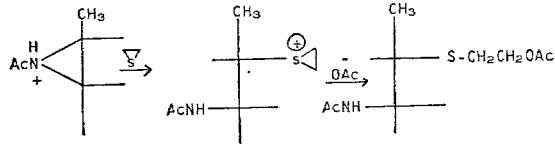

If the cyclic sulfide is unsymmetrical, as in the case of propylene sulfide,

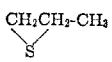

two products are possible for example

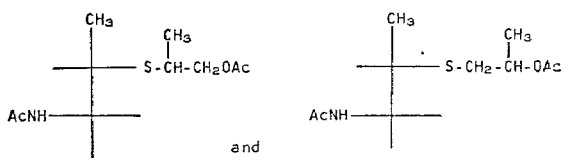

If the cyclic sulfide is oxacyclic or thiacyclic, the oxygen or other sulfur atom, X, will appear in the side chain.

In cyclic sulfides there is also the possibility of a second mole of sulfide reacting in this wise

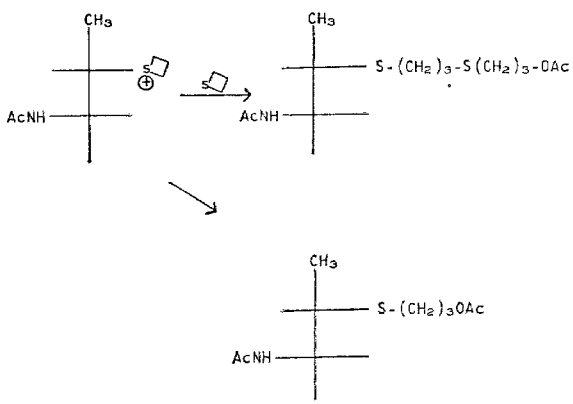

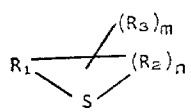

This reaction goes especially well with trimethylene sulfide (thietane) giving about equal amounts of the two products.

Suitable non-aromatic, cyclic sulfides have the formula:

$$R_1 \underset{S}{\overset{(R_3)_m}{\diagdown}} (R_2)_n$$

wherein S is sulfur, $n$ is zero or at least 1, $R_1$ contains at least 2 carbon atoms between the two valences, $R_2$ contains at least 2 carbon atoms between the two valences, and $-R_1-(R_2)_n-$ is alkylene of not more than 14 carbon atoms having not more than 11 carbon atoms between the two valences or alkenylene, alkadienylene, thialkylene, thialkenylene, oxalkylene, or oxalkenylene of not more than 9 carbon atoms having not more than 6 carbon atoms between the two valences; $m$ is zero, 1 or 2; and $R_3$ is phenyl, loweralkylphenyl, benzo or loweralkylbenzo, or hydroxy, loweralkoxy, loweralkenoxy, loweralkanoyl, aroyl of not more than 10 carbon atoms, in which oxygen is not attached to a carbon which is alpha to S, or a divalent group $-CH_2-(Y)_p-CH_2-$ where Y is oxygen, methylene, ethylene (dimethylene), and $p$ is zero or 1.

An aromatic cyclic sulfide is one, like thiophene or thiepin, in which the sulfur atom is linked to two olefinic groups in a conjugated system.

Examples of suitable non-aromatic cyclic sulfides according to the invention are epithioethane (ethylene sulfide),
1,2-epithiopropane (propylene sulfide),
2,3-epithio-2-methylbutane,
1,2-epithio-2-methylpropane,
2,3-epithiobutane,
1,2-epithiobutane,
3,4-epithio-1-butene,
2,3-epithio-2,3-dimethylbutane,
1,2-epithio-2-ethylbutane,
1,2-epithio-2-methylpentane,
2,3-epithio-1-propanol,
2,3-epithio-1-propanol acetate,
2,3-epithiopropyl isopropyl ether,
2,3-epithiopropyl propyl ether,
2,3-epithiopropyl allyl ether,
2,3-epithiopropyl ethyl ether,
2,3-diphenylthiirane,
2,2-diphenylthiirane,
thietane (trimethylene sulfide),
2,4-dimethylthietane,
α-methyl-2-thietanemethanol,
3-methyl-2-thietanemethanol,
tetrahydrothiophene (tetramethylene sulfide),
2-methyl-tetrahydrothiophene,
3-methyl-tetrahydrothiophene,
2-ethyl tetrahydrothiophene,
3-ethyl-tetrahydrothiophene,
2,2-dimethyl-tetrahydrothiophene,
2,3-dimethyl-tetrahydrothiophene,
2,4-dimethyl-tetrahydrothiophene,
2,5-dimethyl-tetrahydrothiophene,
3,3-dimethyl-tetrahydrothiophene,
3,4-dimethyl-tetrahydrothiophene,
2-(7-methyl-octyl)-tetrahydrothiophene,
2-nonyl-tetrahydrothiophene,
2-decyl-tetrahydrothiophene,
2-butyl-3-ethyl-5-propyl-tetrahydrothiophene,
tetrahydrothiophene-3-ol,
tetrahydrothiophene-3-ol acetate,
tetrahydro-2,5-thiophene-dimethanol,
3-ethyl-tetrahydrothiophene-3-ol,
tetrahydrothiopyran,
3-methyl-tetrahydrothiopyran,
4-methyl-tetrahydrothiopyran,
4-tert.butyl-tetrahydrothiopyran,
tetrahydrothiopyran-3-ol,
tetrahydrothiopyran-4-ol,
thiepane, 3,6-thiepanediol,
4-butyl-4-thiepanol,
5-thiocanol,
thiecane,
6,6-dimethyl-thiecane,
7,7-dimethyl-thiacyclododecane,
2,5-dimethyl-3-phenyl-tetrahydrothiophene,
2-phenethyl-tetrahydrothiophene,
2-(3-phenylpropyl)-tetrahydrothiophene,
4,5-epithio-1-pentene,
5,6-epithio-1-hexene,
2,5-dihydro-3-methylthiophene,
2,5-dihydro-2-methylthiophene,
2,3-dihydro-3-methylthiophene,
2,3-dihydro-5-methylthiophene,
3,4-dihydro-2H-thiopyran,
3,6-dihydro-2H-thiopyran,
3,4-dihydro-6-methyl-2H-thiopyran,
2-H-thiopyran, 4-H-thiopyran,
2-methyl-2H-thiopyran,
3-methyl-4H-thiopyran,
4-methyl-4H-thiopyran,
tetrahydro-3,4-dimethylene-thiophene,
4,5-dihydrothiepin,
2,3-dihydro-7-phenyl-benzo[b]thiophene,
3,5-diethyl-2,3-dihydro-benzo[b]thiophene,
3-ethyl-2,3-dihydro-5,7-dimethyl-benzo[b]thiophene,
7-ethyl-1,2,4,5-tetrahydro-3-benzothiepin,
5-ethyl-2,3-dihydro-2,3-dimethyl-benzo[b]thiophene,
2,3-dihydro-2,3,5,7-tetramethyl-benzo[b]thiophene,
2,3-dihydro-3-phenylbenzo[b]thiophene,
7-butyl-1,2,4,5-tetrahydro-3-benzothiepin,
7-ethyl-1,2,4,5-tetrahydro-6,9-dimethyl-3-benzothiepin,
6-thiabicyclo[3.1.0]hexane (cyclopentene sulfide),
7-thiabicyclo[4.1.0]heptane (cyclohexene sulfide),
7-thiabicyclo[2.2.1]heptane,
8-thiabicyclo[3.2.1]octane-3-ol,
5-thiaspiro[2.3]hexane,
2-thiaspiro[3.3]heptane,
2-oxa-6-thiaspiro[3.3]heptane.

Any of the above sulfides that contain one or more hydroxy or sulfhydryl groups can be esterified. Usually these esters will be the acetate or the benzoate but for reasons given below in respect to the $Ac_1$ and $Ac_2$ groups, they can be any carboxacyl. In other words any of the hydrogens of these hydroxy or sulfhydryl groups can be replaced by an $Ac_2$ group which may be the same or different from the $Ac_2$ groups in the 2-, 3-, 4-O-positions.

With any of the above non-aromatic, cyclic monosulfides, the desired result is obtained simply by heating an alkyl N-acetyl-6,7-aziridino-6-deamino - 7 - deoxy-α-thiolincosaminide with the appropriate sulfide in the presence of glacial acetic acid or other anhydrous lower alkanoic acid, or anhydrous benzoic acid or other anhydrous arenoic acids of not more than 12 carbon atoms, for example, propionic or butyric acids.

Advantageously, a solvent boiling at about 70 to 110° C. is used. Ordinarily an excess of sulfide is used for this purpose. Such solvents as dioxane, carbon tetrachloride, benzene, or toluene can be used if desired and advantageously with a sulfide boiling above about 110° C. With low boiling sulfides, like ethylene sulfide, a pressure vessel can be used with advantage.

The proportions are not critical to the reaction, but are critical to the yields. Thus optimum yields are obtained with about 3 to 7 equivalents of acid coupled with a substantial excess, at least twofold, of the sulfide. That is another advantage of using the sulfide as a solvent. When a sulfide, such as ethylene sulfide, which is so low boiling as to give a reaction mixture that refluxes below 70°, is used, super atmospheric pressure can be used; if it is such that the reaction mixture boils above about 110° C., controlled heating can be used. Otherwise it is suitable to heat at the reflux temperature.

The reaction mixture can be worked up by procedures already well known in the art such as counter-current distribution, chromatography, and solvent extraction or crystallization.

The starting compounds exist in two epimeric forms as follows:

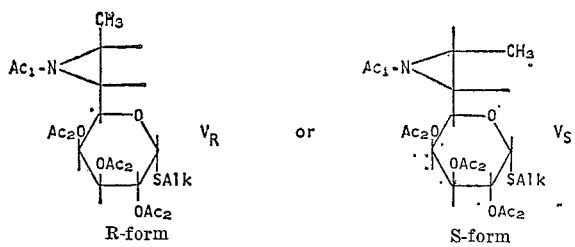

R-form     S-form

The R and S refer to the 7-posiiton as the 6-position is always in the R-form. In the reaction an inversion takes place. For example, when ethylene sulfide is reacted with methyl N-acetyl-2,3,4-tri-O-acetyl-6(R),7(R)-aziridino-6-deamino-7-deoxy-α-thiolincosaminide, methyl N-acetyl-2,3,4-tri-O-acetyl-7-deoxy - 7(S) - (2-acetoxyethylthio)-α-thiolincosaminide is obtained.

The starting compounds of Formula II are obtained by acylating a compound of the formula:

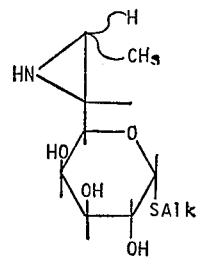

with a carboxacyl acylating agent, such as acetic anhydride or other lower alkanoic acid anhydride or benzoyl chloride or like carboxacyl halide, in a manner already known in the art. Since the amino and hydroxy groups acylate at different rates the N-acyl, $Ac_1$, and the O-acyl, $Ac_2$, can be the same or different.

Inasmuch as these acyl groups ($Ac_1$ and $Ac_2$) do not appear in the final product but are removed in the processing, it is immaterial what they are as long as they are carboxacyl. Suitable such carboxacyls are hydrocarboncarboxacyl containing not more than 18 carbon atoms or halo-, nitro-, hydroxy-, amino-, cyano-, thiocyano-, or alkoxy-substituted hydrocarboncarboxacyls of not more than 18 carbon atoms.

The starting compounds of Formula VI can be prepared by the dehydrohalogenation of a compound of the formula:

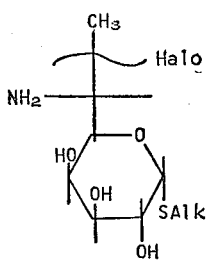

which are known in the art; U.S. Pat. 3,502,648. The dehydrohalogenation is effected by heating a compound of Formula VII in an inert solvent in the presence of an acid acceptor. A suitable process is to heat a reaction mixture of starting compound, anhydrous sodium carbonate and dimethylformamide at reflux for a short time, remove the solvent, and crystallize from a suitable solvent, for example, methanol. See U.S. Pat. 3,544,551.

The starting sulfides are known compounds.

By acylating the compounds of the invention (Formula I) with an L-2-pyrrolidinecarboxylic acid, compounds of Formula IV in which Ac is the acyl of the L-2-pyrrolidinecarboxylic acid are obtained. When Alk is methyl, R is ethylene, and the L-2-pyrrolidinecarboxylic acid is trans-1-methyl-4-propyl - L-2-pyrrolidinecarboxylic acid and the configuration is (S), the compound is 7-deoxy-7(S)-(2-hydroxyethylthio)-lincomycin which has antibacterial activity several times that of linocomycin. It and its analogs can be utilized for the same purposes and in the same way as lincomycin. The lower members have improved Gram-negative activity.

The compounds of the invention (Formula I) as well as the acylates thereof with an L-2-pyrrolidinecarboxylic acid can exist in either the free base form or in the form of an acid addition salt. Unless otherwise specified or otherwise dictated by the context both the acid addition form and the free base form are intended. These acid addition salts can be made by neutralizing the free base with the appropriate acid to below about pH 7.0, and advantageously to about pH 2 to pH. 6. Suitable acids for this purpose include hydrochloric, sulfuric, phosphoric, thiocyanic, fluosilicic, hexafluoroarsenic, hexafluorophosphoric, acetic, succinic, citric, lactic, maleic, fumaric, pamoic, chollic, palmitic, mucic, camphoric, glutari, glycolic, phthalic, tartaric, lauric, stearic, salicyclic, 3-phenylsalicylic, 5-phenylsalicylic, 3-methylglutaric, orthosulfobenzoic, cyclohexanesulfamic, cyclopentanepropionic, 1,2 - cyclohexanedicarboxylic, 4-cyclohexenecarboxylic, octadecenylsuccinic, octenylsuccinic, methanesulfonic, benzenesulfonic, helianthic, Reinecke's, dimethyldithiocarbamic, hexadecylsulfamic, octadecylsulfamic, sorbic, monochloroacetic, undecylenic, 4'-hydroxyazobenzene-4-sulfonic, octyldecylsulfuric, picric, benzoic, cinnamic, and like acids.

The acid addition salts can be used for the same purposes as the free base or they can be employed to upgrade the same. For example, the free base can be converted to an insoluble salt, such as the pictrate, which can be subjected to purification procedures, for example, solvent extractions and washings, chromatography, fractional liquid-liquid extractions, and crystallization and then used to regenerate the free base form by treatment with alkali or to make a different salt by metathesis. Or the free base can be converted to a water-soluble salts, such as the hydrochloride or sulfate and the aqueous solution of the salt extracted with various water-immiscible solvents before regenerating the free base form by treatment of the thus-extracted acid solution or converted to another salt by metathesis.

The free bases can be used as buffers or as antacids. They react with isocyanates to form urethanes and can be used to modify polyurethane resins. The thiocyanic acid addition salt when condensed with formaldehyde forms resinous materials useful as pickling inhibitors according to U.S. Pats. 2,425,320 and 2,606,155. The free bases also make good vehicles for toxic acids. For example, the fluosilicic acid addition salts are useful as mothproofing agents according to U.S. Pats. 1,915,334 and 2,075,359 and the hexafluoroarsenic acid and hexaflorophosphoric acid addition salts are useful as parasiticides according to U.S. Pats. 3,122,536 and 3,122,552.

The invention may now be more fully understood by reference to the following examples in which the parts are by weight except where solvent ratios are given or except as otherwise specified and the c.g.s. system is used unless otherwise specified.

EXAMPLE 1

7-deoxy-7(S)-(2-hydroxyethylthio)-lincomycin hydrochloride

Part A.–1.—Methyl N-acetyl-2,3,4-tri-O-acetyl-7(S)-(2-acetoxyethylthio)-7-deoxy-α-thiolincosaminide:

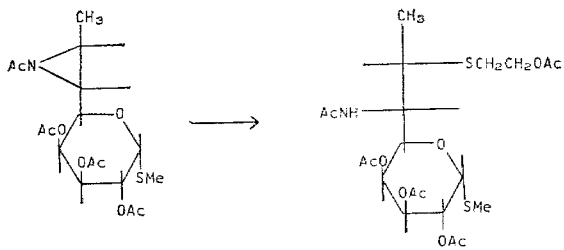

A mixture of 5.0 gm. (1 mol. equiv.) methyl N-acetyl-2,3,4-tri-O-acetyl-6,7-aziridino-6-deamino-7-deoxy - α- thiolincosaminide, 50 cc. ethylene sulfide (thiirane), and 5.25 gm. (7 mol. equivs.) glacial acetic acid is heated in a Pyrex sealed tube for 20 hours in a steam-bath. Volatile materials are removed from the reaction solution by distillation at 100° C., the residue is dissolved in methylene chloride and stirred with an excess of saturated aqueous sodium bicarbonate. Washing of the organic layer with water, drying over anhydrous sodium sulfate, and removal of the solvent on a rotating evaporator at 40°/7 mm. gives a thick yellow syrup showing no starting material by TLC (SiO$_2$ gel, 1 acetone:1 Skellysolve B) and a major new zone of lower $R_f$ (0.50 vs. 0.69). TLC refers to thin layer chromatography and Skellysolve B is technical hexane.

The above syrup which contained a substantial amount of polymeric material derived from the ethylene sulfide is chromatographed to remove this polymeric material. A column of 1200 g. of silica (5.8 x 89 cm.) and a solvent system of 2 ethyl acetate:1 Skellysolve B is used. After a forerun of 1 liter, 50 ml. fractions are taken until all the polymeric material is removed as shown by TLC. The column is then eluted with ethyl acetate. Fractions 81 to 170 are combined and solvent removed by distillation on a rotating evaporator at 40° C./7 mm. to yield 5.81 gm. of crude product.

Countercurrent distribution of this crude product in the system 1 ethanol:1 water:1 ethyl acetate:3 cyclohexane gives methyl N-acetyl-2,3,4-tri-O-acetyl-7(S)-(2-acetoxyethylthio)-7-deoxy-α-thiolincosaminide at a K value of 0.53. It is obtained as colorless needles from ethyl acetate-Skellysolve B having the following characteristics:

M.P. 206–7°.

$[\alpha]_D$ +180° (c., 0.79, CHCl$_3$).

Analysis.—Calcd. for C$_{21}$H$_{33}$ONS$_2$ (percent): C, 48.17; H, 6.35; N, 2.68; S, 12.25. Found (percent): C, 48.12; H, 6.37; N, 2.58; S, 11.95.

Part B–1.—Methyl 7-deoxy - 7(S) - (2-hydroxyethylthio)-α-thiolincosaminide:

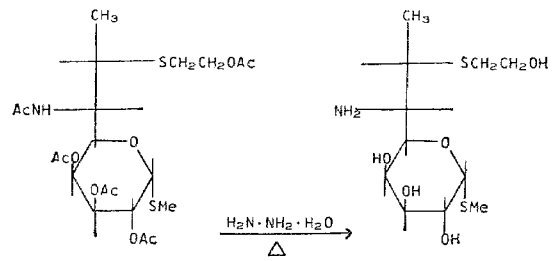

A mixture of 3.68 gm. methyl N-acetyl-2,3,4-tri-O-acetyl-7(S)-(2-acetoxyethylthio) - 7 - deoxy - α - thiolincosaminide (A–1) and 100 cc. hydrazine hydrate is stirred magnetically and heated under gentle reflux in an oil bath at 150° C. overnight. Removal of the volatile material from the colorless solution by distillation from the oil bath at 110° C./7 mm. gives methyl 7-deoxy-7(S)-(2-hydroxyethylthio)-α-thiolincosaminide (B–1) as a colorless syrup. This syrup is chromatographed on 1200 gm. of silica using 1 methanol:3 chloroform as the solvent system. Methyl 7-deoxy-7(S)-(2-hydroxyethylthio)-α-thiolincosaminide is obtained at $R_f$ 0.30, and on crystallization from acetonitrile-ethanol as colorless platelets having the following characteristics:

M.P. 175–6° C.

$[\alpha]_D$ +234° (c., 0.52, H$_2$O).

Analysis.—Calcd. for C$_{11}$H$_{23}$O$_5$NS$_2$ (percent): C, 42.15; H, 7.40; N, 4.47; S, 20.46. Found (percent): C, 42.05; H, 7.55; N, 4.43; S, 20.36.

Part C–1: 7-deoxy-7(S)-(2-hydroxyethylthio)-lincomycin hydrochloride [methyl 6,7,8-trideoxy-7-(2-hydroxyethylthio) - 6-trans-(1-methyl-4-propyl-L-2-pyrrolidinecarboxamido)-1-thio - L - threo-α-D-galactopyranoside hydrochloride]:

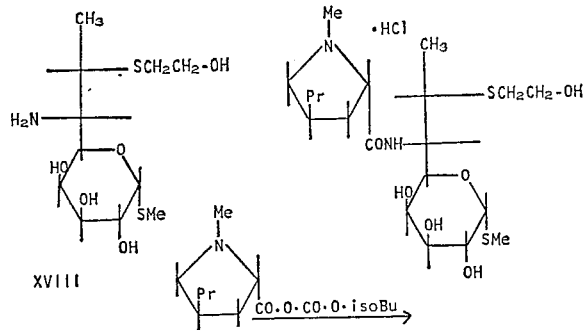

To a suspension of 930 mg. trans-propylhygric acid hydrochloride in 50 cc. anhydrous acetonitrile is added 995 mg. triethylamine. After the solid dissolves, the solution is cooled to —5° C. in an ice-methanol bath, causing the separation of triethylammonium chloride. To this solution is added 610 mg. of isobutyl chloroformate so that the temperature did not exceed —3° C., and the reaction mixture stirred at —3° to —5° C. for 20 minutes. Then 700 mg. of methyl 7-deoxy-7(S)-(2-hydroxyethylthio)-α-thiolincosaminide in 5 cc. methanol and 5 cc. water is added to the mixed anhydride, the precipitate of triethylammonium chloride dissolving at once. After 2 hours, TLC ($SiO_2$ gel, 1 MeOH: 10 $CHCl_3$) shows the disappearance of aminosugar, and the generation of a new zone of higher $R_f$ (0.30). Volatile solvent is removed on a rotating evaporator at 40°/7 mm., and the syrupy residue dissolved in a mixture of water and methylene chloride and the aqueous layer adjusted to ca. pH 10 with 50% aqueous NaOH. The aqueous solution is separated and reextracted twice with methylene chloride, and the combined extracts dried over anhydrous sodium sulfate. The residual alkaline aqueous layer is discarded.

Removal of solvent from the methylene chloride extract on a rotating evaporator at 40° C./7 mm. gives a slightly yellow syrup which is chromatographed on silica (480 gm., column dimensions 3.8 x 95 cm., hold-up volume 850 cc.) in the system 1 methanol:1- chloroform. After a forerun of 250 cc., 50 cc. fractions are collected, and the elution of material followed by TLC on silica in the same system.

Fractions Nos. 25–44, inclusive, are combined to yield, on removal of solvent, 610 mg. of a colorless glass which is converted to the hydrochloride by dissolving in water to which dilute aqueous hydrochloric acid (N) is added till the resultant solution is at ca. pH 3. This solution is then shell-frozen and lyophilized yielding 7-deoxy-7(S)-(2-hydroxyethylthio)-lincomycin hydrochloride (C–3) as a colorless solid having the following characteristics:

$[\alpha]_D$ +114° (c., 0.91, $H_2O$).

Analysis.—Calcd. for $C_{20}H_{38}O_6N_2S_2$·HCl (percent): C, 47.74; H, 7.81; N, 5.57; Cl, 7.05; S, 12.75; mol wt. of free base, 466.65. Found (corrected for 6.75% $H_2O$) (percent): C, 48.05; H, 7.70; N, 5.10; Cl, 6.96; S, 12.50; mol. wt. (mass spec., M+ of free base), 466.

Biological activity: In vitro; about 8 times lincomycin. This compound is about 8 times as active as lincomycin, and has greater Gram-negative activity in vivo and is less toxic, than 7-deoxy-7(S)-chlorolincomycin hydrochloride.

EXAMPLE 2

7-deoxy-7(S)-(3-hydroxypropylthio)lincomycin hydrochloride

Part A–2a.—Methyl N - acetyl-2,3,4-tri-O-acetyl-7(S)- (3 - acetoxypropylthio) - 7 - deoxy-α-thiolincosaminide: Following the procedure of Part A–1, substituting the ethylene sulfide by trimethylene sulfide, there is obtained methyl N-acetyl-2,3,4-tri - O - acetyl-7(S)-(3-acetoxypropylthio)-7-deoxy - α - thiolincosaminide (K=1.0, 1 eth- anol:1 water:1 ethyl acetate:2 cyclohexane) as colorless needles from ethyl acetate:Skellysolve B having the following characteristics:

M.P. 172.5–174°.

$[\alpha]_D$ +178° (c., 0.94, $CHCl_3$).

Analysis.—Calcd. for $C_{22}H_{35}ONS_2$ (percent): C, 49.15; H, 6.56; N, 2.61; S, 11.93. Found (percent): C, 49.31; H, 6.58; N, 2.68; S, 11.83.

Part A–2b.—Methyl N - acetyl-2,3,4-tri-O-acetyl-7(S)- [3-(3-acetoxypropylthio)propylthio]-7-deoxy - α - thiolincosaminide: There is also obtained methyl N-acetyl-2,3,4-tri-O-acetyl-7(S)-[3-(3 - acetoxypropylthio)propylthio]-7-deoxy-α-thiolincosaminide (K=2.3 the same solvent system) as colorless needles having the following characteristics:

M.P. 117–8°.

$[\alpha]_D$ +149° (c., 0.997, $CHCl_3$).

Analysis.—Calcd. for $C_{25}H_{41}ONS_3$ (percent): C, 49.08; H, 6.76; N, 2.29; S, 15.72. Found (percent): C, 49.38; H, 6.14; N, 2.35; S, 15.91.

Part B–2.—Methyl 7-deoxy - 7(S)-(3 - hydroxypropylthio)-α-thiolincosaminide: Following the procedure of Part B–1, substituting the methyl N-acetyl - 2,3,4 - tri-O-acetyl - 7(S)-(2-acetoxyethylthio)-α-thiolincosaminide by methyl N - acetyl-2,3,4-tri-O-acetyl-7(S)-(3-acetoxypropylthio)-7-deoxy-α-thiolincosaminide, there is obtained methyl 7-deoxy-7(S)-(3-hydroxypropylthio) - α - thiolincosaminide as colorless needles from water having the following characteristics:

M.P. 194–196°.

$[\alpha]_D$ +234° (c., 0.79, pyridine).

Analysis.—Calcd. for $C_{12}H_{25}O_5NS_2$ (percent): C, 44.01; H, 7.70; N, 4.28; S, 19.58. Found (percent): C, 43.93; H, 7.81; N, 4.45; S, 19.55.

Part C–2.—7-deoxy-7(S)-(3 - hydroxypropylthio)lincomycin hydrochloride.—Following the procedure of Part C–1, substituting the methyl 7-deoxy-7(S)-(2-hydroxyethylthio)-α-thiolincosaminide by methyl 7-deoxy-7(S)-(3-hydroxypropylthio)-α-thiolincosaminide, there is obtained 7-deoxy-7(S)-(3 - hydroxypropylthio)lincomycin hydrochloride as an amorphous solid having the following characteristics:

$[\alpha]_D$ +110° (c., 0.82, $H_2O$).

Analysis.—Calcd. for $C_{21}H_{40}O_6N_2S_2$·HCl (percent): C, 48.77; H, 7.99; N, 5.42; Cl, 6.86; S, 12.40; mol. wt. of free base 480.68. Found (corrected for 2.86% water) (percent): C, 49.11; H, 8.10; N, 5.88; S, 12.15; Cl, 6.82; mol. wt. (mass spec., M+), 480.

By substituting the compound of Part A–2b there also are obtained methyl 7-deoxy-7(S)-[3-(3 - hydroxypropylthio)propylthio]-α-thiolincosaminide and 7 - deoxy-7(S)- [-(3-hydroxypropylthio)propylthio] - lincomycin hydrochloride.

EXAMPLE 3

7-deoxy-7(S)-(2-hydroxy - 1 - methylethylthio)-lincomycin hydrochloride and 7-deoxy - 7(S)-(2 - hydroxy-2-methylethylthio)-lincomycin hydrochloride Part A–3.—Methyl 7(S)-(2-acetoxy - 1 - methylethylthio)-N-acetyl-2,3,4-tri-O-acetyl-7-deoxy - α - thiolincosaminide and methyl 7(S)-(2-acetoxy-2-methylethylthio)-N - acetyl-2,3,4-tri-O-acetyl-7-deoxy-α-thiolincosaminide: Following the procedure of Part A–1, substituting the ethylene sulfide by propylene sulfide (1,2-epithiopropane), there is obtained a mixture of 40 parts methyl 7(S)-(2-acetoxy-1-methylethylthio)-N-acetyl-2,3,4-tri - O - acetyl-7-deoxy-α-thiolincosaminide and 60 parts methyl 7(S)-(2-acetoxy-2-methylethylthio)-N-acetyl-2,3,4-tri - O - acetyl-7 - deoxy - α - thiolincosaminide (K=0.83, 1 ethanol:1 water:1 ethyl acetate:3 cyclohexane) as small, colorless, flattened needles from ethyl acetate:Skellysolve B having the following characteristics:

M.P. 198–199° C.

$[\alpha]_D$ +170° (c., 0.94, $CHCl_3$).

*Analysis.*—Calcd. for $C_{22}H_{35}O_{10}NS_2$ (percent): C, 49.15; H, 6.56; N, 2.61; S, 11.93. Found (percent): C, 49.41; H, 6.47; N, 2.34; S, 11.53.

The principal component is also synthesized by substituting the cyclic sulfide by 2-hydroxy-2-methylethyl methyl sulfide. It melts at 246–251° C. and on acetylation at 199–200° C. In a like manner the 2-hydroxy-1-methylethyl isomer is obtained by substituting the cyclic sulfide by 2-hydroxy-1-methylethyl methyl sulfide and acetylating the resulting product.

Part B–3.—Methyl 7-deoxy-7(S)-(2-hydroxy-1-methylethylthio)-α-thiolincosaminide and methyl 7-deoxy-7(S)-(2-hydroxy-2-methylethylthio)-α - lincosaminide: Following the procedure of Part B–1, there is obtained the corresponding mixture of 7-deoxy - 7(S) - (2 - hydroxy - 1- methylethylthio)-α-lincosaminide and 7-deoxy-1(S) - (2-hydroxy-2-methylethylthio)-α-thiolincosaminide as minute crystalline plates from methanol having the following characteristics:

M.P. 191–2°.

$[\alpha]_D$ +218° (c., 0.50, water)

*Analysis.*—Calcd. for $C_{12}H_{25}O_5NS_2$ (percent): C, 44.01; H, 7.70; N, 4.28; S, 19.58. Found (percent): C, 43.88; H, 7.96; N, 4.36; S, 19.39.

Part C–3.—7-deoxy-7(S)-(2-hydroxy-1 - methylethylthio)-lincomycin hydrochloride and 7-deoxy-7(S)-(2-hydroxy-2-methylethylthio)-lincomycin hydrochloride: Following the procedure of C–1, there is obtained the corresponding mixture of 7-deoxy-7(S)-(2-hydroxy-1-methylethylthio)-lincomycin hydrochloride and 7-deoxy-7-(S)-(2-hydroxy-2-methylethylthio)-lincomycin hydrochloride as an amorphous solid having the following characteristics:

$[\alpha]_D$ +104° (c., 0.83, water).

*Analysis.*—Calcd. for $C_{21}H_{40}O_6N_2S_2 \cdot HCl$ (percent): C, 48.77; H, 7.99; N, 5.42; Cl, 6.86; S, 12.40; mol. wt. free base, 480.68. Found (corrected for 2.02% water) (percent): C, 48.80; H, 785; N, 5.54; Cl, 7.00; S, 12.40; mol. wt. (Mass spec., M+), 480.

EXAMPLE 4

7(S)-(4-acetoxybutylthio)-7-deoxylincomycin hydrochloride

Part A–4.—Methyl 7(S)-(4-acetoxybutylthio) - 7 - deoxy-α-thiolincosaminide: Following the procedure of Part A–1, substituting the ethylene sulfide by tetrahydrothiophene (tetramethylenesulfide) but heating at 110° C. for 20 hours, there is obtained methyl N-acetyl-2,3,4-tri-O-acetyl-7(S)-(4-acetoxybutylthio)-7 - deoxy - α - thiolincosaminide (K=1.32), 1 ethanol:1 water:1 ethyl acetate:2 cyclohexane) as fine rosettes of needles from ethyl acetate-Skellysolve B having the following characteristics:

M.P. 149–150° C.

$[\alpha]_D$ +171° (c., 0.88, CHCl₃).

*Analysis.*—Calcd. for $C_{23}H_{37}O_{10}NS_2$ (percent): C. 50.07; H, 6.76; N, 2.54; S, 11.62. Found (percent): C, 49.97; H, 6.86; N, 2.50; S, 11.35.

Part B–4.—Methyl 7-deoxy-7(S)-(4 - hydroxybutyl)-α-thiolincosaminide: Following the procedure of Example 1, Part B–1, there is obtained methyl 7-deoxy-7(S)-(4-hydroxybutylthio)-α - thiolincosaminide as microcrystalline needles from methanol having the following characteristics:

M.P. 164–5°.

$[\alpha]_D$ +218° (c., 0.41, H₂O).

*Analysis.*—Calcd. for $C_{13}H_{27}O_5NS_2$ (percent): C, 45.72; H, 7.97; N, 4.10; S, 18.78. Found (percent): C, 45.73; H, 8.13; N, 4.22; S, 18.33.

Part C–4.—7-deoxy-7(S)-(4-hydroxybutylthio)-linocomycin hydrochloride: Following the procedure of Example 1, Parts C–1, there is obtained 7-deoxy-7(S)-(4-hydroxybutylthio)-lincomycin hydrochloride as an amorphous solid having the following characteristics:

$[\alpha]_D$ +105° (c., 0.96, H₂O).

*Analysis.*—Calcd. for $C_{22}H_{42}O_6N_2S_2 \cdot HCl$ (percent): C, 49.74; H, 8.16; N, 5.28; Cl, 6.68; S, 12.07; mol wt. of free base, 494.70. Found (corrected for 3.70% H₂O): C, 49.58; H, 8.19; N, 5.23; Cl, 6.48; S, 12.10; mol. wt. (mass spec., M+ of free base), 494.

EXAMPLE 5

Methyl N-acetyl-2,3,4-tri-O-acetyl-7(S)-(2-acetoxycyclohexylthio)-7-deoxy-α-thiolincosaminide Following the procedure of Part A–1, substituting the ethylene sulfide by cyclohexene sulfide (7-thiabicyclo-[4.1.0]heptane) and heating at 100° C. for 16 hours, there is obtained methyl N-acetyl-2,3,4-tri-O-acetyl-7(S)-(2 - acetoxycyclohexylthio)-7-deoxy-α-thiolincosaminide. Countercurrent distribution in the solvent system 1 ethanol:1 water:0.5 ethyl acetate:3 cyclohexane yielded this compound at a K value of 0.80. It is obtained as colorless needles from ethyl acetate having the following characteristics:

M.P. 205–6° C.

$[\alpha]_D$ +153° (c., 0.64, CHCl₃).

*Analysis.*—Calcd. for $C_{25}H_{39}O_{10}NS_2$ (percent): C, 51.97; H, 6.80; N, 2.43; S, 11.10; mol wt. 577.70. Found (percent): C, 51.82; H, 6.87; N, 2.29; S, 11.12; mol. wt. (mass spec., M+), 577.

Following the procedure of Parts B–1 and C–1, there are obtained methyl 7-deoxy-7(S)-[(2 - hydroxycyclohexyl)-thio]-α-thiolincosaminide and 7-deoxy-7(S)-[(2-hydroxycyclohexyl)thio]-lincomycin hydrochloride.

EXAMPLE 6

Methyl N-acetyl-2,3,4-tri-O-acetyl-7(S)-(5-acetoxypentylthio)-7-deoxy-α-thiolincosaminide Following the procedure of Part A–1 except that a pressure vessel is not required, pentamethylene sulfide (tetrahydrothiopyran) is converted to methyl N-acetyl-2,3,4-tri-O-acetyl-7(S) - (5-acetoxypentylthio)-7-deoxy-α-thiolincosaminide having a K value of 1.94 in 1 ethanol:1 H₂O:1 ethyl acetate:2 cyclohexane and the following characteristics as recrystallized from ethyl acetate:Skellysolve B.

M.P. 158–9° C. (needles).

$[\alpha]_D$ +169° (c. 0.60, CHCl₃).

*Analysis.*—Calcd. for $C_{24}H_{39}O_{10}NS_2$ (percent): C, 50.95; H, 6.95; N, 2.48; S, 11.34. Found (percent): C, 50.88; H, 6.98; N, 2.41; S, 11.22.

Following the procedures of Parts B–1 and C–1, there are obtained methyl 7-deoxy-7(S)-(5-hydroxypentylthio)-α-thiolincosaminide and 7-deoxy-7(S)-(5-hydroxypentylthio)lincomycin hydrochloride.

I claim:

1. A process for making compounds of the formula:

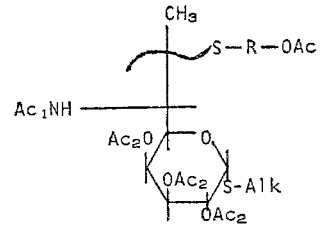

wherein Alk is alkyl of not more than 4 carbon atoms or —CH₂—CH₂—OAc₂; Ac₁ and Ac₂ are hydrocarboncarboxacyl containing not more than 18 carbon atoms or halo-, nitro-, hydroxy-, amino-, cyano-, thiocyano-, or alkoxy-substituted hydrocarboncarboxacyls of not more than 18 carbon atoms; and R is the divalent radical of formula:

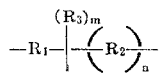

wherein R₁ contains at least 2 carbon atoms between the two valences; R₂ contains at least 2 carbon atoms between the two valences; and —R$_1$(R$_2$)$_n$ is alkylene of not more than 14 carbon atoms having no more than 11 carbon atoms between the two valences or alkenylene, alkadienylene, thialkylene, thialkenylene, oxalkylene, or oxalkenylene of not more than 9 carbon atoms having not more than 6 carbon atoms between the two valences; $m$ is zero, 1, or 2; and R$_3$ is phenyl, loweralkylphenyl, benzo, loweralkylbenzo, loweralkoxy, or loweralkenoxy in which oxygen is not attached to a carbon which is alpha to the sulfide sulfur or a divalent group —CH$_2$—(Y)$_p$—CH$_2$— where Y is oxygen, methylene, or ethylene, and $p$ is zero or 1; which consists essentially of heating at a temperature up to reflux temperature, a mixture of (1) an aziridino compound of the formula:

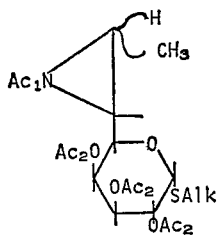

wherein Ac$_1$, Ac$_2$, and Alk are as given above (2) a sulfide of the formula

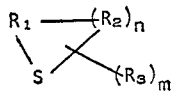

wherein R$_1$, R$_2$, R$_3$ $m$ and $n$ are as defined above; (3) an anhydrous acid of the formula AcOH where Ac is lower alkanoyl or aroyl of not more than 12 carbon atoms, and optionally (4) a solvent having a boiling point of between about 70° to 110° C.

2. A process according to claim 1 in which R is alkylene.
3. A process according to claim 1 in which R is ethylene.
4. A process according to claim 1 in which R is trimethylene.
5. A process according to claim 1 in which R is tetramethylene.
6. A process according to claim 1 in which R is pentamethylene.
7. A process according to claim 1 in which R is 1,2-cyclohexylene.
8. A process according to claim 1 in which R is

—CHCH$_3$—CH$_2$—

9. A process according to claim 1 wherein said mixture is heated within a temperature range of from about 70° C. to about 110° C.
10. A process according to claim 1 wherein the proportion of sulfide is at least 2 molar equivalents and the proportion of acid is from about 3 to about 7 equivalents; for each equivalent of aziridino compound.
11. A process according to claim 1 wherein said mixture includes a solvent selected from dioxane, carbon tetrachloride, benzene and toluene.
12. A process according to claim 1 wherein said mixture is heated to reflux temperature.
13. A process according to claim 1 wherein said anhydrous acid is glacial acetic acid.

References Cited
UNITED STATES PATENTS
3,317,509  5/1967  Bannister _____ 260—210 R LEWIS GOTTS, Primary Examiner J. R. BROWN, Assistant Examiner

UNITED STATES PATENT OFFICE
CERTIFICATE OF CORRECTION

Patent No. 3,767,649　　　　　Dated 23 October 1973

Inventor(s) Brian Bannister

It is certified that error appears in the above-identified patent and that said Letters Patent are hereby corrected as shown below:

Column 1, line 40, -- I -- should appear near the formula; line 60, -- II -- should appear near the formula; line 50, "atached" should read -- attached --;

Column 2, line 15, -- III -- should appear near the formula; line 48, -- IV -- should appear near the formula;

Column 5, line 74, "posiiton" should read -- position --;

Column 6, -- VI -- should appear near the formula; line 32, "carboxacyl" should read -- carboxyacyl --; line 50, -- VII -- should appear near the formula; line 70, "linocomycin" should read -- lincomycin --;

Column 7, "chollic" should read -- cholic --; line 12, "glutari," should read -- glutaric, --; lines 12-13, "salicyclic" should read -- salicylic --; line 25, "pictrate" should read -- picrate --; lines 46-47, "hexafloro-phosphoric" should read -- hexafluorophosphoric --;

Column 9, line 13, -- XIX -- should appear near the formula; line 43, "1 methanol:1- chloroform" should read -- 1 methanol:10 chloroform --;

Column 10, line 52, "[-(3-" should read -- [3-(3- --;

Column 11, line 16, "7-deoxy-1(S)-" should read -- 7-deoxy-7(S)-; line 38, "785" should read -- 7.85 --.

Signed and Sealed this

Nineteenth Day of May 1981

[SEAL]

Attest:

RENE D. TEGTMEYER

Attesting Officer　　　Acting Commissioner of Patents and Trademarks